United States Patent
Ding et al.

(10) Patent No.: US 10,394,247 B2
(45) Date of Patent: Aug. 27, 2019

(54) AUTOMATIC TRACKING SHOPPING CART

(71) Applicant: BOE Technology Group Co., Ltd., Beijing (CN)

(72) Inventors: Hongli Ding, Beijing (CN); Yu Gu, Beijing (CN); Yue Li, Beijing (CN); Ying Zhang, Beijing (CN); Kai Zhao, Beijing (CN); Yifei Zhang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/552,158

(22) PCT Filed: Apr. 5, 2017

(86) PCT No.: PCT/CN2017/079475
§ 371 (c)(1),
(2) Date: Aug. 18, 2017

(87) PCT Pub. No.: WO2018/090543
PCT Pub. Date: May 24, 2018

(65) Prior Publication Data
US 2018/0335786 A1    Nov. 22, 2018

(30) Foreign Application Priority Data
Nov. 17, 2016 (CN) .......................... 2016 1 1020109

(51) Int. Cl.
*G05D 1/02* (2006.01)
*G01C 21/00* (2006.01)
(Continued)

(52) U.S. Cl.
CPC ............. *G05D 1/0246* (2013.01); *B62B 3/14* (2013.01); *B62B 5/0069* (2013.01); *G01C 21/00* (2013.01);
(Continued)

(58) Field of Classification Search
USPC .......................................................... 701/28
See application file for complete search history.

(56) References Cited

U.S. PATENT DOCUMENTS

| 6,378,684 B1* | 4/2002 | Cox ...................... G07F 7/0636 194/213 |
| 2008/0011836 A1* | 1/2008 | Adema .................. G06Q 10/00 235/383 |

(Continued)

FOREIGN PATENT DOCUMENTS

| CN | 101612950 A | 12/2009 |
| CN | 201808591 U | 4/2011 |

(Continued)

OTHER PUBLICATIONS

International Search Report and Written Opinion, including English translations of International Search Report and Box V of the Written Opinion, for International Application No. PCT/CN2017/079475, dated May 31, 2017, 14 pages.

*Primary Examiner* — Tyler D Paige
(74) *Attorney, Agent, or Firm* — Westman, Champlin & Koehler, P.A.

(57) ABSTRACT

The present disclosure provides an automatic tracking shopping cart. The automatic tracking shopping cart comprises an automatic tracking device. The automatic tracking device is fixed to a body of the shopping cart, operative to control movement of the shopping cart for tracking a target object. The automatic tracking device comprises: an image collection unit configured to collect a color image and a depth image of a field of image; a processing unit configured to identify the target object based on the collected color image and depth image, and determine a motion parameter of the shopping cart based on a position and/or movement of the target object; and a shopping cart driving unit configured to drive the shopping cart to move based on the determined (Continued)

motion parameter. A method for automatically controlling movement of a shopping cart to track a target object is also provided.

18 Claims, 3 Drawing Sheets

(51) Int. Cl.
*B62B 3/14* (2006.01)
*G06K 9/00* (2006.01)
*G06T 7/20* (2017.01)
*G06T 7/55* (2017.01)
*G06K 9/62* (2006.01)
*G06K 9/03* (2006.01)
*B62B 5/00* (2006.01)
*G06T 7/194* (2017.01)

(52) U.S. Cl.
CPC ..... *G06K 9/00362* (2013.01); *G06K 9/00664* (2013.01); *G06K 9/03* (2013.01); *G06K 9/6212* (2013.01); *G06T 7/194* (2017.01); *G06T 7/20* (2013.01); *G06T 7/55* (2017.01); *G06T 2207/10024* (2013.01); *G06T 2207/10028* (2013.01); *G06T 2207/20024* (2013.01); *G06T 2207/30196* (2013.01)

(56) References Cited

U.S. PATENT DOCUMENTS

| | | | |
|---|---|---|---|
| 2009/0240571 A1* | 9/2009 | Bonner | H04W 4/029 705/27.1 |
| 2010/0026802 A1* | 2/2010 | Titus | G08B 13/19608 348/143 |
| 2013/0182905 A1* | 7/2013 | Myers | H04N 7/18 382/103 |
| 2014/0379296 A1* | 12/2014 | Nathan | G06Q 10/08 702/150 |
| 2015/0206121 A1* | 7/2015 | Joseph | G06Q 20/208 705/23 |
| 2015/0229906 A1* | 8/2015 | Inacio De Matos | G05D 1/0246 348/46 |

FOREIGN PATENT DOCUMENTS

| | | |
|---|---|---|
| CN | 102289556 A | 12/2011 |
| CN | 102867311 A | 1/2013 |
| JP | 2006-155039 A | 6/2006 |

* cited by examiner

AUTOMATIC TRACKING SHOPPING CART

CROSS-REFERENCE TO RELATED APPLICATION(S)

This application is a U.S. national application of the International Application No. PCT/CN2017/079475 filed on Apr. 5, 2017 and entitled "AUTOMATIC TRACKING SHOPPING CART", which claims priority to a Chinese application No. CN201611020109.7, filed on Nov. 17, 2016 and entitled "AUTOMATIC TRACKING SHOPPING CART", which are incorporated herein by reference in their entirety.

TECHNICAL FIELD

The present disclosure relates to the field of Artificial Intelligence, and more particularly, to an automatic tracking shopping cart.

BACKGROUND

Currently, shoppers need to manually push a shopping cart to walk when shopping in a supermarket. However, it is not convenient for the shopper to take care of his/her shopping cart when carefully picking a wide variety of goods. Such inconvenience is more severe for certain specific circumstances or specific people. For example, it is not easy for an elder shopper to push the shopping cart with lots of goods and meanwhile to control translation and steering of the shopping cart flexibly, and his body may be injured without much attention. It is thus desired to improve the existing shopping cart, in order to improve shopping experience and enhance safety in specific shopping scenarios.

SUMMARY

In order to at least partially address the above problem in the conventional solution, the present disclosure provides an automatic tracking shopping cart.

According to an aspect of the present disclosure, an automatic tracking shopping cart is provided. The automatic tracking shopping cart comprises: an automatic tracking device fixed to a body of the shopping cart, operative to control movement of the shopping cart for tracking a target object. In particular, the automatic tracking device comprises: an image collection unit configured to collect a color image and a depth image of a field of view; a processing unit configured to identify the target object based on the collected color image and depth image, and determine a motion parameter of the shopping cart based on a position and/or movement of the target object; and a shopping cart driving unit configured to drive the shopping cart to move based on the determined motion parameter.

In an embodiment, the processing unit comprises: a target determination module configured to determine target characteristics of the target object in the color image and a target depth of the target object in the depth image based on the collected color image and depth image; an image analysis module configured to determine a current depth of the target object from a color image and a depth image of a current frame based on target characteristics and a target depth determined in a previous frame; and a driving calculation module configured to determine the movement parameter of the shopping cart based on the calculated current depth.

In an embodiment, the automatic tracking shopping cart further comprises a console configured to receive an instruction input by a user, and the target determination module is configured to determine a human target in the collected color image which is closest to the shopping cart as the target object based on the instruction received by the console indicating that a new target object needs to be determined.

In an embodiment, the target determination module is configured to take the current depth as a target depth for a next frame, when the image analysis module successfully determines the current depth of the target object from the color image and the depth image of the current frame.

In an embodiment, the target determination module is configured to re-determine a human target in the collected color image which has target characteristics best matching the target characteristics determined in the previous frame as the target object, when the image analysis module fails to determine the current depth of the target object from the color image and the depth image of the current frame.

In an embodiment, the target determination module is configured to calculate a histogram of respective human targets in the currently collected color image; match the histogram of the respective human targets with a histogram of a target object determined in the previous frame to determine matching values for the respective human targets; and re-determine the human target which has the highest matching value higher than a reference matching value as the target object.

In an embodiment, the target determination module is configured to, if each of the determined respective matching values is lower than the reference matching value, adjust a collection direction of the image collection unit, and re-collect the color image and the depth image.

In an embodiment, the automatic tracking device further comprises an alarming unit, and the target determination module is further configured to trigger the alarming unit, if the human target which has the matching value higher than the reference matching value cannot be determined from the re-collected color image and depth image.

In an embodiment, the image analysis module is configured to calculate a background projection image based on the color image and the depth image of the current frame; cut a view with a predetermined depth range out of the calculated background projection image based on the target depth; perform expansion and average filtering processing on the image with the predetermined depth range; and determine the current depth of the target object.

In an embodiment, the driving calculation module is configured to determine a current distance between the target object and the shopping cart based on the calculated current depth, and trigger the shopping cart driving unit to drive the shopping cart when the current distance is larger than a reference distance.

In an embodiment, the motion parameter comprises an average velocity v of the shopping cart in a next time period, the average velocity v being determined based on $$v = \frac{\Delta l_2 - \Delta l_1 + L}{T}.$$

In an embodiment, the automatic tracking device further comprises a memory for storing the color image, the depth image, the target characteristics and/or the target depth.

According to another aspect of the present disclosure, a method for automatically controlling movement of a shopping cart to track a target object is provided. The method comprises collecting a color image and a depth image of a field of view; identifying the target object based on the collected color image and depth image, and determining a motion parameter of the shopping cart based on a position and/or movement of the target object; and driving the shopping cart to move based on the determined motion parameter.

BRIEF DESCRIPTION OF THE DRAWINGS

In order to more clearly illustrate the technical solution in the embodiments of the present invention, the following drawings, which are intended to be used in the description of the embodiments, will be briefly described. It will be apparent that the drawings in the following description are merely examples of the present disclosure, Other drawings of the art may be obtained by those skilled in the art without departing from the inventive work.

DETAILED DESCRIPTION

Hereinafter, particular embodiments of the present disclosure will be described in detail. It should be noted that the embodiments described herein are for illustrative purposes only but are not intended to limit the present disclosure. In the following description, numerous specific details are set forth in order to provide thorough understanding of the present disclosure. It will be apparent, however, to the skilled in the art that the present disclosure need not be implemented with these specific details. In other instances, well-known circuits, materials, or methods are not specifically described in order to avoid obscuring the present disclosure.

Throughout the specification, reference to "one embodiment", "an embodiment", "one example" or "an example" means that particular features, structures, or characteristics described in connection with the embodiment or example are incorporated herein by reference In at least one embodiment. Thus, the phrase "in one embodiment", "in an embodiment", "in one example" or "in an example" appear throughout the specification does not necessarily refer to the same embodiment or example. In addition, specific features, structures, or characteristics may be combined in one or more embodiments or examples in any suitable combination and/or sub-combination. In addition, it will be understood by the skilled in the art that the drawings provided herein are for the purpose of illustration and are not necessarily drawn in scale. The term "and/or" used herein includes any and all combinations of one or more of the items listed.

The present disclosure will now be described in detail with reference to the accompanying drawings.

Figure 1:
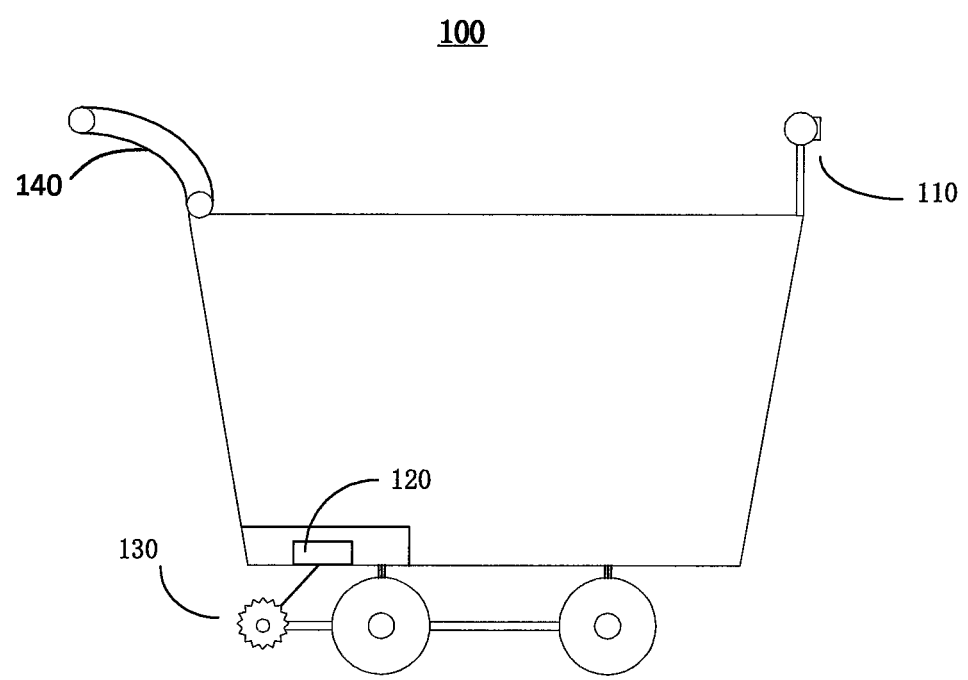
FIG. 1 shows a schematic structure diagram of an exemplary automatic tracking shopping cart 100 according to an embodiment of the present disclosure.

FIG. 1 shows a schematic structure diagram of an exemplary automatic tracking shopping cart 100 according to an embodiment of the present disclosure.

As shown in FIG. 1, the automatic tracking shopping cart 100 comprises an automatic tracking device. The automatic tracking device comprises an image collection unit 110, a processing unit 120 and a shopping cart driving unit 130, which are all fixed to a body of the shopping cart 100, and operative to control movement of the shopping cart for tracking a target object.

In FIG. 1, the image collection unit 110, the processing unit 120, and the shopping cart driving unit 130 are shown at different positions of the body of the shopping cart. That is, the automatic tracking device is constituted by separate components. It should be understood that the structure as shown in FIG. 1 is merely an exemplary structure of the present disclosure and is not intended to limit the scope of the present disclosure. In other embodiments, the image collection unit 110, the processing unit 120, and the shopping cart driving unit 130 may be implemented as an integrated automated tracking device, i.e., the automatic tracking device is formed as a single physical entity.

In FIG. 1, the image collection unit 110 communicates with the processing unit 120 through a wireless connection, and the processing unit 120 communicates with the shopping cart driving unit 130 through a wired connection. Also, it should be understood that the manners of connections as shown in FIG. 1 are only an example of the present disclosure. In other embodiments, any suitable connections may be used between the image collection unit 110 and the processing unit 120, and between the processing unit 120 and the shopping cart driving unit 130, such as a wireless communication way, e.g., WiFi, Bluetooth, mobile networks, etc, In addition to the image collection unit 110, the processing unit 120, and the shopping cart driving unit 130, the automatic tracking shopping cart 100 further comprises a console 140. The console 140 as shown in FIG. 1 is located at a handrail of the automatic tracking shopping cart 100. Of course, in other embodiments, the console 140 may be located at other locations, such as near the image collection unit 110. The console may be implemented by conventional electronic devices having input functions, such as a keyboard, a mouse, a touch screen, a mobile phone, a tablet computer, a microphone device, and the like. The user may control, by operations such as inputting, selection etc., the automatic tracking shopping cart 100 to enter different modes, such as registration, tracking, standby, power off, etc., and may control the automatic tracking shopping cart 100 to perform different operations in the different modes.

The automatic tracking shopping cart 100 further comprises structures and components in the conventional shopping carts, such as the body, the handrail, wheels (e.g., caster wheels), boxes, etc., which are not described here in detail.

The image collection unit 110 as shown is configured to collect a color image and a depth image of a field of view. In one embodiment, the image collection unit 110 is an RGB-D camera.

The processing unit 120 is configured to identify the target object based on the collected color image and depth image, and determine a motion parameter of the shopping cart 100 based on a position and/or movement of the target object. Hereinafter, the processing unit 120 will be described in detail with reference to FIG. 2.

The shopping cart driving unit 130 is configured to drive the shopping cart 100 to move based on the determined motion parameter. In one embodiment, the shopping cart driving unit 130 includes a battery, an Arm control panel, a motor driver, a motor (e.g., a brushless DC motor), and the like.

In one embodiment, the automatic tracking device further comprises a memory. The memory is used to store the color image, the depth image, target characteristics and/or a target depth as described below.

Figure 2:
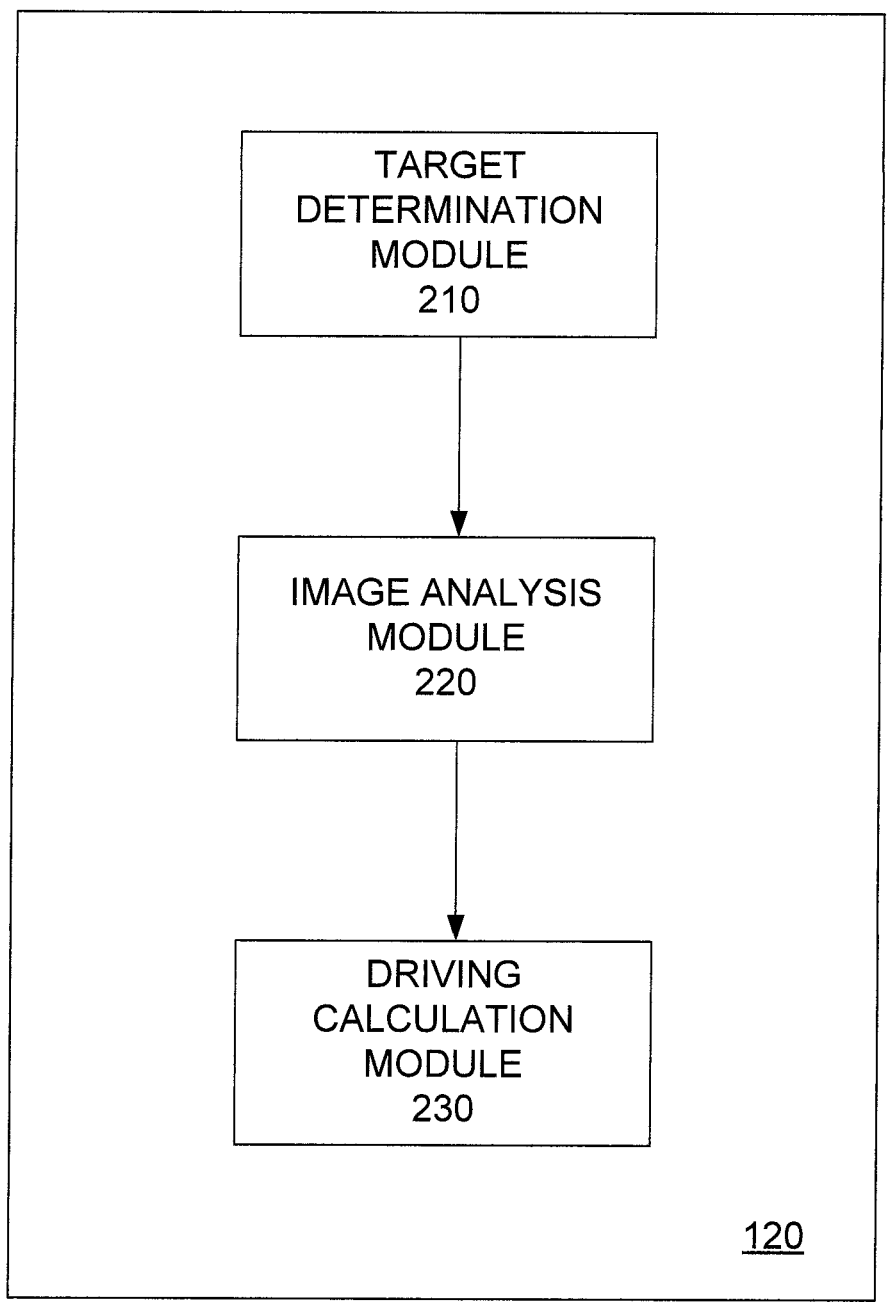
FIG. 2 shows an exemplary schematic structure block diagram of a processing unit 120 in the automatic tracking shopping cart 100 as shown in FIG. 1.

FIG. 2 shows an exemplary schematic structure block diagram of a processing unit 120 in the automatic tracking shopping cart 100 as shown in FIG. 1.

As shown in FIG. 2, the processing unit 120 comprises a target determination module 210, an image analysis module 220 and a driving calculation module 230. In particular, the target determination module 210 is configured to determine target characteristics of the target object in the color image and a target depth of the target object in the depth image based on the collected color image and depth image. The image analysis module 220 is configured to determine a current depth of the target object from a color image and a depth image of a current frame based on target characteristics and a target depth determined in a previous frame. The driving calculation module 230 is configured to determine the movement parameter of the shopping cart based on the calculated current depth.

The target determination module 210 obtains the collected color image and depth image, and determines the target characteristics of the target object which is embodied in the color image. The target characteristics may be, e.g., an outline, color, size in a particular dimension, etc. of the target object.

When the shopping cart is used for the first time (i.e., in the registration mode) (defined as the first frame), it is necessary to identify the target object firstly and then determine the target characteristics. In one embodiment, the user inputs, by the console, an instruction indicating that a new target object needs to be determined. The target determination module 210 determines a human target in the collected color image which is closest to the shopping cart as the target object in conjunction with the collected color image and the depth image, based on the instruction received by the console indicating that a new target object needs to be determined.

In the tracking process after the registration (i.e., the second frame, the third frame . . . ), the target determination module 210 uses the target characteristics determined in the previous frame as the target characteristics used in the current frame. In one embodiment, if tracking failure occurs in the frame, the target characteristics may be updated or corrected, and then the updated target characteristics in the current frame is determined as the target characteristics used in the next frame.

The target determination module 210 also determines the target depth of the target object which is embodied in the depth image.

In the registration mode, the target object is identified, and the current depth (initial depth) of the target object, i.e., the target depth determined in the current registered frame (used for the next frame), may be determined from the depth image collected by the image collection unit 110.

In the subsequent respective frames, the target determination module 210 uses the "current" depth determined in the previous frame as the target depth in the current frame. The target depth is equivalent to to an initial value for determining the actual depth of the target object that has advanced in the current frame, which is thereby used for implementing the technical solution of the present disclosure in conjunction with the algorithm described below.

After the target depth is determined, the image analysis module 220 is configured to determine the current depth of the target object from the color image and the depth image of the current frame. In particular, this process may comprises the following steps:

calculating a background projection image based on the color image and the depth image of the current frame, wherein the background projection image may be understood as a 3D image obtained from a combination of the color image and the depth image, i.e., the 3D image is formed by assigning values in a third dimension to respective objects in a 2D color image according to depth values in the depth image;

cutting an image with a predetermined depth range out of the calculated background projection image based on the target depth, e.g., an image with a depth range of ±m centimeters relative to the target depth, wherein a value range of m may be set as required, e.g., m∈[5, 20];

performing expansion and average filtering processing on the image with the predetermined depth range; and determining the current depth of the target object.

In one embodiment, the determination of the current depth of the target object may be achieved by a continuous adaptive mean shift (Camshift) algorithm.

The driving calculation module 230 is configured to determine the movement parameter of the shopping cart based on the calculated current depth. the motion parameter comprises an average velocity v of the shopping cart in a next time period, the average velocity v being determined based on $$v = \frac{\Delta l_2 - \Delta l_1 + L}{T},$$

wherein T is a duration of a time period, $\Delta l_1$ is a distance between the shopping cart and the target object at a start of a current time period, $\Delta l_2$ is a distance between the shopping cart and the target object at an end of the current time period, and L is a distance of the shopping cart moving within the current time period.

In one embodiment, the driving calculation module 230 is configured to determine a current distance between the target object and the shopping cart based on the calculated current depth, and trigger the shopping cart driving unit 130 to drive the shopping cart only if the current distance is larger than a reference distance.

In the process of using the automatic track shopping cart 100, it is also possible that the image analysis module 220 fails to determine the current depth of the target object from the color image and the depth image of the current frame. In this case, it is necessary to re-determine the target object.

In one embodiment, the target determination module 210 re-determines the human target in the collected color image which has target characteristics best matching the target characteristics determined in the previous frame as the target object, when the image analysis module 220 fails to determine the current depth of the target object from the color image and the depth image of the current frame.

In some embodiments, re-determining the human target in the collected color image which has the target characteristics best matching the target characteristics determined in the previous frame as the target object comprises: calculating a histogram of respective human targets in the currently collected color image; matching the histogram of the respective human targets with a histogram of a target object determined in the previous frame to determine matching values for the respective human targets; and re-determining the human target which has the highest matching value higher than a reference matching value as the target object.

If each of the determined respective matching values is lower than the reference matching value, the processing unit 120 notifies the image collection unit 110 of adjusting its image collection direction and re-collecting the color image and the depth image after the adjustment of the direction. Then, the processing unit 120 repeats the above process based on the re-collected color image and depth image.

If a human target with a matching value higher than the reference matching value still cannot be determined from the color image and the depth image re-collected (or re-collected multiple times, such as three times), the processing unit 120 does not notify the image collection unit 110 of adjusting the collection direction any more, but triggers an alarming unit arranged on the shopping cart 100 to alert the user to perform a re-registration.

Figure 3:
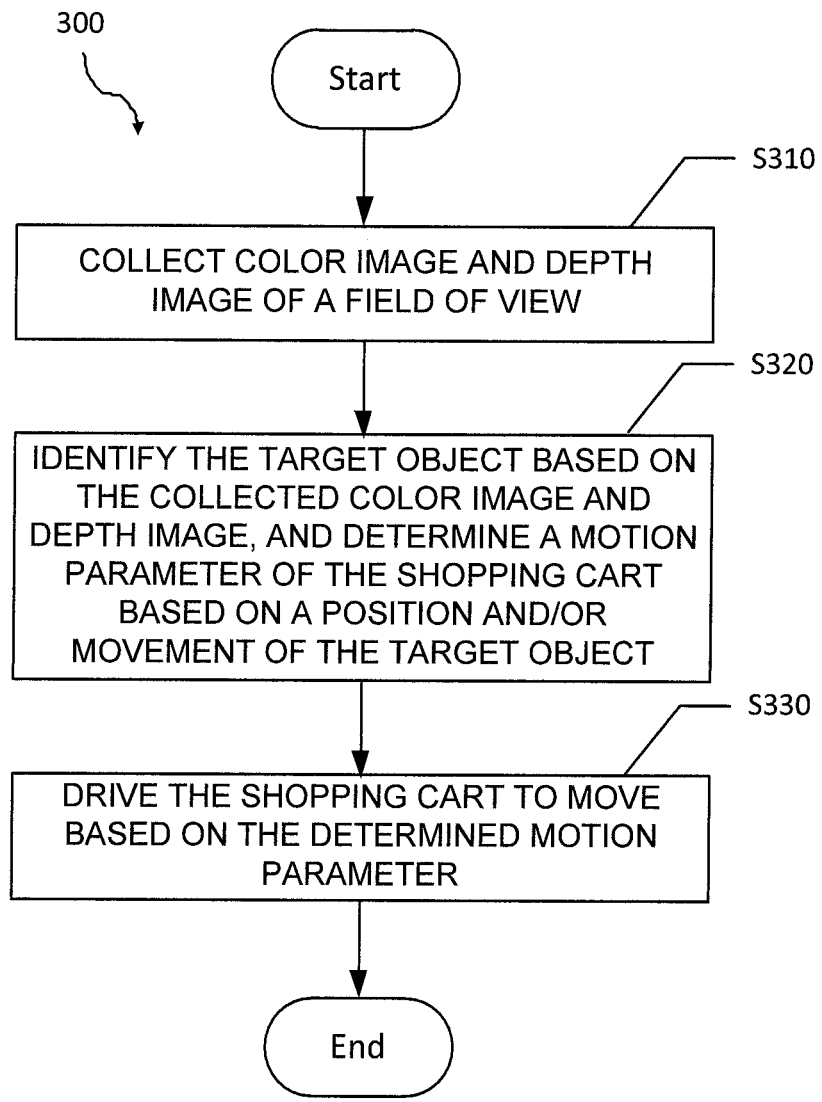
FIG. 3 shows a flow chart of a method for automatically controlling movement of a shopping card according to an embodiment of the present disclosure.

FIG. 3 shows a flow chart of a method 300 for automatically controlling movement of a shopping card according to an embodiment of the present disclosure.

As shown in FIG. 3, the method 300 for automatically controlling movement of a shopping card so as to track a target object starts at operation S310, where a color image and a depth image of a field of view is collected. Then at operation S320, the target object is identified based on the collected color image and depth image, and then a motion parameter of the shopping cart is determined based on a position and/or movement of the target object. The method then proceeds to operation S330, where the shopping cart is driven to move based on the determined motion parameter.

According to an embodiment, operation S320 of determining a motion parameter may comprise determining target characteristics of the target object in the color image and a target depth of the target object in the depth image based on the collected color image and depth image; determining a current depth of the target object from a color image and a depth image of a current frame based on target characteristics and a target depth determined in a previous frame; and determining the movement parameter of the shopping cart based on the calculated current depth.

As for the target object, according to an embodiment, a human target in the collected color image which is closest to the shopping cart may be determined as the target object based on an instruction indicating that a new target object needs to be determined.

When the current depth of the target object is successfully determined from the color image and the depth image of the current frame in operation in operation S320, the current depth may be taken as a target depth for a next frame.

When the current depth of the target object cannot be determined from the color image and the depth image of the current frame in operation S320, operation S320 may further comprise re-determining a human target in the collected color image which has target characteristics best matching the target characteristics determined in the previous frame as the target object.

According to an embodiment, re-determining a human target in the collected color image which has target characteristics best matching the target characteristics determined in the previous frame as the target object may comprise: calculating a histogram of respective human targets in the currently collected color image; matching the histogram of the respective human targets with a histogram of a target object determined in the previous frame to determine matching values for the respective human targets; and re-determining the human target which has the highest matching value higher than a reference matching value as the target object.

According to an embodiment, determining a current depth of the target object may comprise: calculating a background projection image based on the color image and the depth image of the current frame; cutting an image with a predetermined depth range out of the calculated background projection image based on the target depth; performing expansion and average filtering processing on the image with the predetermined depth range; and determining the current depth of the target object.

Various embodiments of the automatic tracking shopping cart have been described hereinbefore using block diagrams, flow charts and/or examples. It should be appreciated that, in the case that the block diagrams, flow charts and/or examples include one or more functions and/or operations, each function and/or operation included in the block diagrams, flow charts and/or examples may be implemented individually, or collectively, through hardware, software, firmware or essentially the combinations thereof. In one embodiment, several parts of the subject matter of the present disclosure may be implemented by an application specific integrated circuit (ASIC), a field programmable gate array (FPGA), a digital signal processor (DSP) or any other integration formats. However, it should also be appreciated that, some aspects of the embodiments of the present disclosure may be, completely or partially, implemented equivalently in an integrated circuit as one or more programs capable of being run on one or more computers (e.g., computer systems), one or more programs capable of being run on one or more processors (e.g., microprocessors), firmware, or essentially combinations thereof. According to the present disclosure, a person skilled in the art has the capability of designing the circuits and/or writing software and/or firmware codes. In addition, it should further be appreciated that, mechanisms of the subject matter of the present disclosure may be dispersed as program products in various forms, and regardless of the types of a signal-carrying medium actually used for the dispersion, the signal-carrying medium may be applicable to the illustrative embodiments of the subject matter of the present disclosure. Examples of the signal-carrying medium include, but not limited to, a recording-type medium such as a soft disc, a hard disc drive, a compact disc (CD), a digital versatile disc (DVD), a digital tape and a computer memory; and a transmission-type medium such as a digital and/or analogue communication medium (e.g., an optical fiber/cable, a waveguide tube, a wired communication link and a wireless communication link).

While the present disclosure has been described with reference to several typical embodiments, it should be understood that the terms used are illustrative and exemplary but not restrictive. As the present disclosure may be embodied in various forms without departing from the spirit or spirit of the disclosure, it should be understood that the above-described embodiments are not limited to any of the foregoing details but should be construed broadly within the spirit and scope as defined by the appended claims. Thus, all modifications and variations that fall within the scope of the claims or the equivalents thereof are intended to be embraced by the appended claims.

We claim:

1. An automatic tracking shopping cart, comprising:
an automatic tracking device fixed to a body of the shopping cart, and operative to control movement of the shopping cart for tracking a target object, the automatic tracking device comprising:
an image collection unit configured to collect a color image and a depth image of a field of view;
a processing unit configured to identify the target object based on the collected color image and depth image, and determine a motion parameter of the shopping cart based on a position and/or movement of the target object; and a shopping cart driving unit configured to drive the shopping cart to move based on the determined motion parameter, wherein the processing unit comprises:

a target determination module configured to determine target characteristics of the target object in the color image and a target depth of the target object in the depth image based on the collected color image and depth image;

an image analysis module configured to determine a current depth of the target object from a color image and a depth image of a current frame based on target characteristics and a target depth determined in a previous frame; and a driving calculation module configured to determine the movement parameter of the shopping cart based on the calculated current depth.

2. The automatic tracking shopping cart according to claim 1, wherein the automatic tracking shopping cart further comprises a console configured to receive an instruction input by a user, and the target determination module is configured to determine a human target in the collected color image which is closest to the shopping cart as the target object based on the instruction received by the console indicating that a new target object needs to be determined.

3. The automatic tracking shopping cart according to claim 1, wherein the target determination module is configured to take the current depth as a target depth for a next frame, when the image analysis module successfully determines the current depth of the target object from the color image and the depth image of the current frame.

4. The automatic tracking shopping cart according to claim 1, wherein the target determination module is configured to re-determine a human target in the collected color image which has target characteristics best matching the target characteristics determined in the previous frame as the target object, when the image analysis module fails to determine the current depth of the target object from the color image and the depth image of the current frame.

5. The automatic tracking shopping cart according to claim 4, wherein the target determination module is configured to calculate a histogram of respective human targets in the currently collected color image;

match the histogram of the respective human targets with a histogram of a target object determined in the previous frame to determine matching values for the respective human targets; and re-determine the human target which has the highest matching value higher than a reference matching value as the target object.

6. The automatic tracking shopping cart according to claim 1, wherein the image analysis module is configured to:

calculate a background projection image based on the color image and the depth image of the current frame;

cut an image with a predetermined depth range out of the calculated background projection image based on the target depth;

perform expansion and average filtering processing on the image with the predetermined depth range; and determine the current depth of the target object.

7. The automatic tracking shopping cart according to claim 1, wherein the driving calculation module is configured to determine a current distance between the target object and the shopping cart based on the calculated current depth, and trigger the shopping cart driving unit to drive the shopping cart when the current distance is larger than a reference distance.

8. The automatic tracking shopping cart according to claim 1, wherein the motion parameter comprises an average velocity v of the shopping cart in a next time period, the average velocity v being determined based on $$v = \frac{\Delta l_2 - \Delta l_1 + L}{T},$$

wherein T is a duration of a time period, $\Delta l_1$ is a distance between the shopping cart and the target object at a start of a current time period, $\Delta l_2$ is a distance between the shopping cart and the target object at an end of the current time period, and L is a distance of the shopping cart moving within the current time period.

9. The automatic tracking shopping cart according to claim 1, wherein the automatic tracking device further comprises a memory for storing the color image, the depth image, the target characteristics and/or the target depth.

10. An automatic tracking shopping cart, comprising:

an automatic tracking device fixed to a body of the shopping cart, and operative to control movement of the shopping cart for tracking a target object, the automatic tracking device comprising:

an image collection unit configured to collect a color image and a depth image of a field of view;

a processing unit configured to identify the target object based on the collected color image and depth image, and determine a motion parameter of the shopping cart based on a position and/or movement of the target object; and a shopping cart driving unit configured to drive the shopping cart to move based on the determined motion parameter, wherein the processing unit is configured to adjust a collection direction of the image collection unit if the processing unit fails to identify the target object, and the image collection unit re-collects the color image and the depth image.

11. The automatic tracking shopping cart according to claim 10, wherein the automatic tracking device further comprises an alarming unit, and the target determination module is further configured to trigger the alarming unit, if the human target which has the matching value higher than the reference matching value cannot be determined from the re-collected color image and depth image.

12. A method for automatically controlling movement of a shopping cart to track a target object, comprising Collecting a color image and a depth image of a field of view;

identifying the target object based on the collected color image and depth image, and determining a motion parameter of the shopping cart based on a position and/or movement of the target object; and driving the shopping cart to move based on the determined motion parameter, wherein the determining a motion parameter of the shopping cart based on a position and/or movement of the target object comprises:

determining target characteristics of the target object in the color image and a target depth of the target object in the depth image based on the collected color image and depth image;

determining a current depth of the target object from a color image and a depth image of a current frame based on target characteristics and a target depth determined in a previous frame; and determining the movement parameter of the shopping cart based on the calculated current depth.

13. The method according to claim 12, further comprises:

determining a human target in the collected color image which is closest to the shopping cart as the target object based on an instruction indicating that a new target object needs to be determined.

14. The method according to claim 12, wherein when the current depth of the target object is successfully determined from the color image and the depth image of the current frame, the method further comprises:

taking the current depth as a target depth for a next frame.

15. The method according to claim 12, wherein when the current depth of the target object cannot be determined from the color image and the depth image of the current frame, the method further comprises:

re-determining a human target in the collected color image which has target characteristics best matching the target characteristics determined in the previous frame as the target object.

16. The method according to according to claim 15, wherein re-determining a human target in the collected color image which has target characteristics best matching the target characteristics determined in the previous frame as the target object comprises:

calculating a histogram of respective human targets in the currently collected color image;

matching the histogram of the respective human targets with a histogram of a target object determined in the previous frame to determine matching values for the respective human targets; and re-determining the human target which has the highest matching value higher than a reference matching value as the target object.

17. The method according to according to claim 12, wherein determining a current depth of the target object comprises:

calculating a background projection image based on the color image and the depth image of the current frame;

cutting an image with a predetermined depth range out of the calculated background projection image based on the target depth;

performing expansion and average filtering processing on the image with the predetermined depth range; and determining the current depth of the target object.

18. The method according to according to claim 12, wherein the motion parameter comprises an average velocity v of the shopping cart in a next time period, the average velocity v being determined based on $$v = \frac{\Delta l_2 - \Delta l_1 + L}{T},$$

wherein T is a duration of a time period, $\Delta l_1$ is a distance between the shopping cart and the target object at a start of a current time period, $\Delta l_2$ is a distance between the shopping cart and the target object at an end of the current time period, and L is a distance of the shopping cart moving within the current time period.

* * * * *